(12) United States Patent
Forster

(10) Patent No.: US 11,794,953 B2
(45) Date of Patent: Oct. 24, 2023

(54) VIRTUALLY TRANSPARENT PACKAGING SYSTEM

(71) Applicant: AVERY DENNISON RETAIL INFORMATION SERVICES LLC, Mentor, OH (US)

(72) Inventor: Ian J. Forster, Chelmsford (GB)

(73) Assignee: Avery Dennison Retail Information Services LL, Mentor, OH (US)

( * ) Notice: Subject to any disclaimer, the term of this patent is extended or adjusted under 35 U.S.C. 154(b) by 405 days.

(21) Appl. No.: 16/712,067

(22) Filed: Dec. 12, 2019

(65) Prior Publication Data

US 2020/0189795 A1 Jun. 18, 2020

Related U.S. Application Data

(60) Provisional application No. 62/778,529, filed on Dec. 12, 2018.

(51) Int. Cl.
*G06K 7/10* (2006.01)
*G06K 7/14* (2006.01)
(Continued)

(52) U.S. Cl.
CPC ....... *B65D 25/205* (2013.01); *G06K 7/10366* (2013.01); *G06K 7/1413* (2013.01);
(Continued)

(58) Field of Classification Search
CPC ......... G06K 7/10366; G06K 19/06028; G06K 7/1413; G06K 19/0723; A23V 2200/08; B65D 77/0406
(Continued)

(56) References Cited

U.S. PATENT DOCUMENTS 8,659,397 B2 * 2/2014 Vargo ................ G06K 7/10069
340/572.1
10,565,555 B1 * 2/2020 Kim ....................... G06F 16/23
(Continued)

FOREIGN PATENT DOCUMENTS

CN 101218839 A * 7/2008 ............. G06Q 20/12
CN 109615286 A * 4/2019
(Continued)

OTHER PUBLICATIONS

International Search Report and Written Opinion dated Mar. 5, 2020 issued in corresponding IA No. PCT/US2019/065924 filed Dec. 12, 2019.
(Continued)

*Primary Examiner* — Edwyn Labaze

(57) ABSTRACT

A packaging system that is manufactured entirely out of recyclable materials and that allows consumers to view the items, such as food items, within the package container is disclosed. Specifically, the packaging system comprises a package container manufactured entirely out of recyclable materials, and a code identifier component positioned thereon which is linked to an image or other information of the product contained within the package container. The code identifier component is typically a 2D bar code or an RFID tag. Further, the image linked to the code identifier component can be generic, or the actual individual image of the product in the container, and the image can be associated with the product during its manufacture, or when it is packaged. The image can be viewed with a tablet, mobile phone, virtual reality headset, a provided terminal, or other suitable device.

18 Claims, 7 Drawing Sheets

(51) Int. Cl.
  *G06K 19/06* (2006.01)
  *G06K 19/07* (2006.01)
  *B65D 25/20* (2006.01)

(52) U.S. Cl.
  CPC ... *G06K 19/06028* (2013.01); *G06K 19/0723* (2013.01); *B65D 2203/06* (2013.01); *B65D 2203/10* (2013.01)

(58) Field of Classification Search
  USPC ....... 426/106, 108; 235/375, 462.01, 462.09, 235/487
  See application file for complete search history.

(56) References Cited

U.S. PATENT DOCUMENTS

| | | | | |
|---|---|---|---|---|
| 2010/0153220 | A1* | 6/2010 | Hamm | G06Q 20/10 705/16 |
| 2011/0178888 | A1* | 7/2011 | O'Connor | G06Q 30/0601 705/317 |
| 2012/0004769 | A1 | 1/2012 | Hellenbeck et al. | |
| 2014/0324627 | A1* | 10/2014 | Haver | G06Q 30/0273 701/519 |
| 2015/0242842 | A1* | 8/2015 | Piva | G06Q 20/3278 340/572.1 |
| 2018/0033352 | A1 | 2/2018 | Kufus | |
| 2021/0065272 | A1* | 3/2021 | Phillips | G06Q 30/016 |

FOREIGN PATENT DOCUMENTS

| | | |
|---|---|---|
| JP | 2005-55711 | 3/2005 |
| JP | 2016-018236 | 2/2016 |
| JP | 2016181093 A * | 10/2016 |
| JP | 2022512403 A * | 12/2019 |
| KR | 10-1506496 | 3/2015 |

OTHER PUBLICATIONS

International Preliminary Report on Patentability dated Jun. 8, 2021 issued in corresponding IA No. PCT/US2019/065924 filed Dec. 12, 2019.

* cited by examiner

VIRTUALLY TRANSPARENT PACKAGING SYSTEM

CROSS REFERENCE TO RELATED APPLICATION(S)

The present application claims priority to and the benefit of U.S. provisional utility patent application No. 62/778,529 filed Dec. 12, 2018, which is incorporated herein by reference in its entirety.

BACKGROUND

The present invention relates generally to a virtually transparent packaging system that enables a user to virtually view the contents of a package, such as a food package or the like, and related information about said contents prior to purchase and without physically opening the package and without the need for a transparent window on the exterior of the package. The system of the present invention utilizes a code identifier component affixed to the exterior of the package that enables the user to retrieve information about the contents of the package, including an image of said contents. More specifically, the system of the present invention allows for the transparent window typically associated with prior art packaging, such as food packaging, to be removed from the package and replaced with a code identifier component, such as a 2D bar code or a radio-frequency identification ("RFID") tag, which is then linked to an image and/or related information about the contents of the package. The system of the present invention is particularly suitable for food packaging items typically containing a transparent window. Accordingly, the present specification makes specific reference thereto. However, it is to be appreciated that aspects of the present invention are also equally amenable to other types of packages and packaging including, without limitation, those pertaining to non-food items.

Generally stated, radio-frequency identification is the use of electromagnetic energy to stimulate a responsive device (known as an RFID "tag" or transponder) to identify itself and, in some cases, provide additionally stored data in the tag. RFID tags typically include a semiconductor device commonly called the "chip" on which are formed a memory and operating circuitry, which is connected to an antenna. Typically, RFID tags act as transponders, providing information stored in the chip memory in response to a radio frequency interrogation signal received from a reader, also referred to as an interrogator. In the case of passive RFID devices, the energy of the interrogation signal also provides the necessary energy to operate the RFID tag device.

RFID tags are generally formed by connecting an RFID chip to some form of antenna. Antenna types are very diverse, as are the methods of constructing the same. One particularly advantageous method of making RFID tags is to use a strap, a small device with an RFID chip connected to two or more conductors that can be coupled to an antenna. The coupling of the conductors to the antenna can be achieved using a conductive connection, an electric field connection, magnetic connection or a combination of coupling methods.

RFID tags may be incorporated into or attached to articles to be tracked. In some cases, the tag may be attached to the outside of an article with adhesive, tape, or other means of securing the tag to the article and, in other cases, the RFID tag may be inserted within the article, such as being included in the packaging, located within the container of the article, or sewn into a garment. Further, RFID tags are manufactured with a unique identification number which is typically a simple serial number of a few bytes with a check digit attached. This identification number is incorporated into the RFID tag during its manufacture. The user cannot alter this serial/identification number, and manufacturers guarantee that each RFID tag serial number is used only once and is, therefore, unique. Such read-only RFID tags typically are permanently attached to an article to be tracked and, once attached, the serial number of the tag is associated with its host article in a computer database.

It is currently common for items, such as food items, to be sold in packaging having a transparent window that enables a consumer to view the contents of the package prior to purchase. In this manner, consumers can inspect at least a portion of the contents of the package or container without physically opening the same. Unfortunately, there are a number of limitations and disadvantages associated with said types of prior art packages and containers. For example, the window on such packages is typically manufactured of a plastic of some form, which can be difficult to recycle. Further, the existence of a difficult to recycle component of the packaging may make it difficult to recycle the remaining components of the packaging (e.g., cardboard or other easily recyclable materials) because of the need to separate the two materials prior to recycling, which may be both impractical and cost prohibitive. Because it is desirable to be able to recycle the entire package, it is also desirable to manufacture the entire package out of the same easily recyclable material, while still permitting the consumer to view at least a portion of the contents of the package prior to purchase and without physically opening the package.

Another limitation currently associated with incorporating a transparent, plastic window in a package or container, such as those that contain food or food related items, is the increased manufacturing costs associated with producing said packages and/or containers. More specifically, and by way of example, it is more expensive and time consuming to produce a cardboard package or container having a separate plastic window incorporated therein, than to manufacture a unitary cardboard container or package without said plastic window. Unfortunately, unitary cardboard packages without said plastic window do not afford the consumer the opportunity to view the contents of the package prior to purchasing the same and without physically opening the package.

Therefore, there exists in the art a long felt need to manufacture a package for an item, such as a food item, entirely out of a recyclable material that enables a consumer to view the contents of said package, as well as related information about the contents, prior to purchase and without having to physically open said package or container. The present invention discloses a novel, virtually transparent packaging system that eliminates the need for a transparent window in the package, and replaces it with a code identifier component. An image of the contents of the package, as well as related information about said contents, may be linked to one or more code identifier components. In this manner, a consumer can simply scan the code identifier component(s) with an electronic device, such as a smart phone, barcode reader, RFID scanner or the like, and view an image of the contents of the package, such as food items, and related information prior to purchasing the same and without having to physically open the package or container. Further, because the need for a transparent window has been eliminated, the container or package may be manufactured from a single, easily recyclable material (e.g., cardboard or the like), thereby overcoming the above referenced limitations typically associated with prior art packages and containers manufactured from multiple different materials, some of which that may be difficult or impractical to recycle.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a virtually transparent packaging system that is manufactured entirely out of recyclable materials, eliminates the need for a separate transparent window and the limitations associated therewith, and that allows consumers to view the contents within the package or container prior to purchase and without having to physically open the package or container. More specifically, the virtually transparent packaging system comprises a packaging container manufactured entirely out of recyclable materials, such as cardboard, and a code identifier component which is linked to an image and/or related information about the contents of the packaging container. However, the present invention may also comprise of a packaging container manufactured partially out of recyclable materials and/or partially recyclable materials. For example, the packaging container may comprise of at least one recyclable material and at least one partially recyclable material. One embodiment of the present invention may comprise of a packaging container partially manufactured of cardboard and/or corn starch or a combination of the two. In yet another embodiment the packaging container may be manufactured to comprise of at least one recyclable material(s), at least one partially recyclable material(s) and at least one non-recyclable material(s). The quantity of each recyclable material and or partially recyclable material present is at a manufacturers discretion. For example, in one embodiment the packaging container may be manufactured comprising 0%-50% recyclable materials and 0%-50% non-recyclable materials. In yet another embodiment the packaging container may be manufactured comprising 0%-50% of at least one recyclable material and 0%-50% of another recyclable material. The percentages of the various materials presented are but a few examples of the potential possibilities. It is to be further recognized that the packaging container may comprise more or less than 50% of any given recyclable and/or partially recyclable material(s) when in combination with another recyclable and/or partially recyclable material(s). Additionally, the composition of the packaging container may have an above average green score. The green score may be calculated as follows: Green score=(A %×Ar)+(B %×Br)+(C %×Cr), where A %+B %+C %=100 and Ar, Br and Cr are a score based on ease of recycling or disposal.

The code identifier component is preferably a 2D bar code or an RFID tag. Further, the image linked to the code identifier component can be generic, or it can be the image of the specific contents of that particular package, and the image can be associated with the contents during their manufacture, or when the same are placed within the packaging. The image can be viewed by a consumer or other user with an electronic device, such as a mobile phone, virtual reality headset, a provided terminal, or other suitable device.

In another embodiment, the packaging container may have more than one 2D bar code and/or RFID tag. The at least one 2D barcode and/or RFID tag may be positioned on a surface of the package/object and linked to a 3D model of the package/object. This linkage allows for the mapping of the materials of the packaging container/object i.e. what materials are located where on the given package/object. This will allow an automated disassembly tool, for example a laser cutter or mill, using the 2D barcode and/or RFID tag to orient itself with respect to the object and make cuts/mill away areas of specific materials and allowing them to be separated. For example, the cutter may identify the area of corrugate that has a transparent window, cut it away and then use an air jet to move it away from the other material. The 2D barcode and/or RFID tag may also be linked to specific color(s) on a given package/object. The linkage between the 2D barcode and/or RFID tag to specific color(s) allows for the separation of materials (multi-colored plastics, papers, cardboards etc.) of different colors on a conveyer belt.

In an alternative embodiment of the present invention, a combination of a display screen and a camera can be used by a consumer to view the contents of the package or container prior to purchase and without having to physically open the package, wherein the consumer presents the package or container under the viewing window of the camera and is able to view inside the package or container. The view can be two or three-dimensional, and could also provide the consumer with additional information about the contents of the package or container, such as nutritional information about a food product contained in the package, instructions for using the contents, "best used by" or other product expiration information, etc. In addition to a view of the product and information related thereto, virtual or real special offers or promotional items may be included inside the package or container, such as marketing discounts or coupons, or alternative product choices for the consumer to consider.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
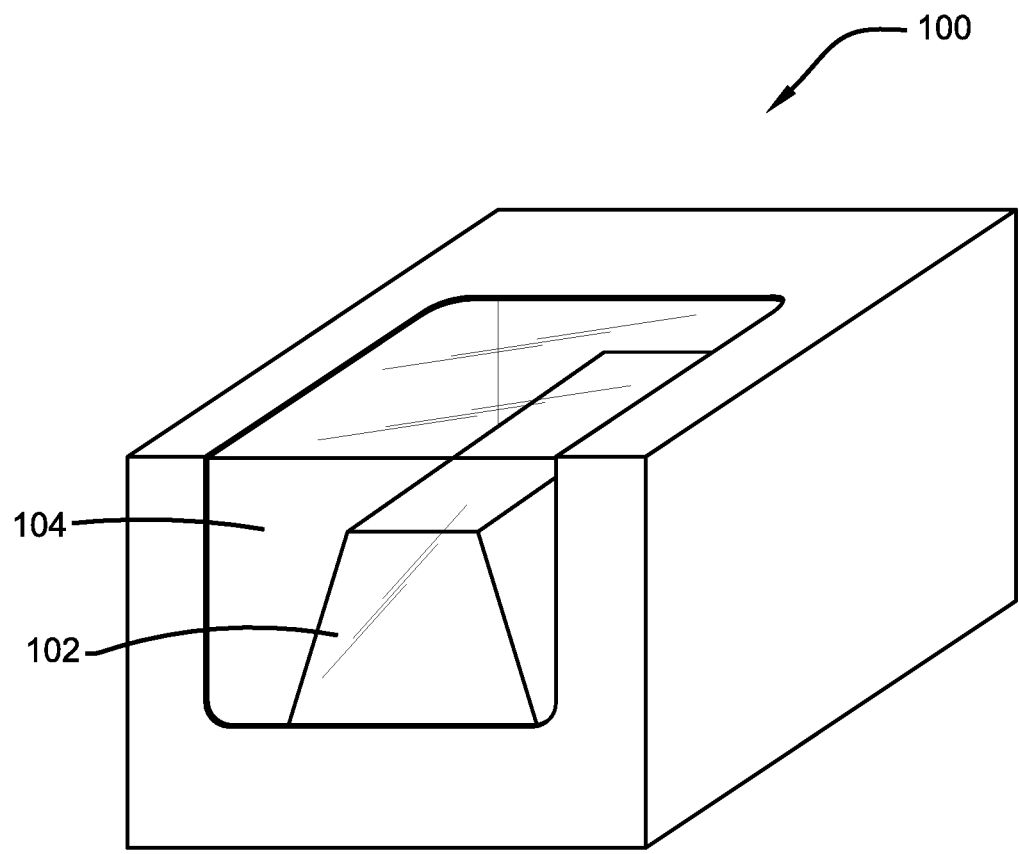
FIG. 1 illustrates a front perspective view of a packaging container, such as a food packaging container, of the prior art with a transparent window for viewing the contents of the packaging container prior to purchase and without having to physically open said packaging container.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

In one embodiment, the present invention discloses a virtually transparent packaging system, such as a food packaging system, that is manufactured entirely out of recyclable materials and that eliminates the need for a separate transparent window and the limitations associated therewith. The unique virtually transparent packaging system of the present invention allows consumers to view the items contained within the package or container prior to purchase and without having to physically open said container or package. The virtually transparent packaging system of the present invention is particularly suitable for food packaging items and, accordingly, the present specification makes specific reference thereto. However, it is to be appreciated that aspects of the present invention are also equally amenable to other types of packages and packaging including, without limitation, those pertaining to non-food items.

More specifically, the food packaging system comprises a food packaging container manufactured entirely out of recyclable materials, such as cardboard, and a code identifier component which is linked to a product image and/or product related information. The code identifier component is preferably a two-dimensional (2D) bar code or an RFID tag. Further, the image linked to the code identifier component can be generic, or can be a specific individual image of the exact product in the container, and the image can be associated with the product during its manufacture, or when it is packaged in said container. The image can be viewed with a tablet, mobile phone, virtual reality headset, a provided terminal, or other suitable device.

Additionally, a combination of a display screen and a camera can be used to view the contents of the unique packaging system, wherein consumers present the packaging system under or in front of a viewing window of the camera, and are able to view the contents of the packaging system or related information. The view can be two or three-dimensional, or it can offer additional information about the contents of the package or container, such as nutritional information, expiration date, product instructions, etc. Moreover, in addition to a view of the contents, virtual or special offers or promotional items may be included with the package, such as marketing discounts or coupons, or other alternative products for the consumer's consideration.

Referring initially to the drawings, FIG. 1 illustrates a front perspective view of an example of a prior art food packaging box, carton or other container 100 containing a food item or other suitable packaged item 102, and a transparent window 104 for viewing the food item 102 inside the food packaging container 100 prior to purchase and without having to physically open container 100. Unfortunately, such prior art packages and containers 100 suffer from a number of limitations.

More specifically, prior art package or container 100 is typically manufactured of cardboard or any other suitable recyclable material as is known in the art, and the transparent window 104 is manufactured of some form of plastic or any other suitable transparent material as is known in the art. Obviously, it is desirable to be able to recycle container 100 after use. However, as previously mentioned, while the transparent window 104 allows a consumer to view the food item 102 within the container 100 prior to purchase and without opening said container 100, the existence of the plastic material of the transparent window 104 makes it difficult or impractical for the consumer to recycle the container 100 or the more easily recyclable portions of the container 100 (e.g., the cardboard portions).

Accordingly, the basic concept of one embodiment of the virtually transparent packaging system of the present invention is to provide a container or package that is manufactured entirely of recyclable materials, and wherein the transparent window is removed and replaced by one or more code identifier components. As described more fully below, the code identifier component(s) can be a 2D bar code, or an RFID tag, or any other suitable code as is known in the art, and is linked to an image or other related information concerning the contents of the package or container. In this manner, consumers can inspect at least a portion of the contents of the package or container prior to purchase and without physically opening the same, and still be able to easily and efficiently recycle the container or package following their use of the same.

Figure 2:
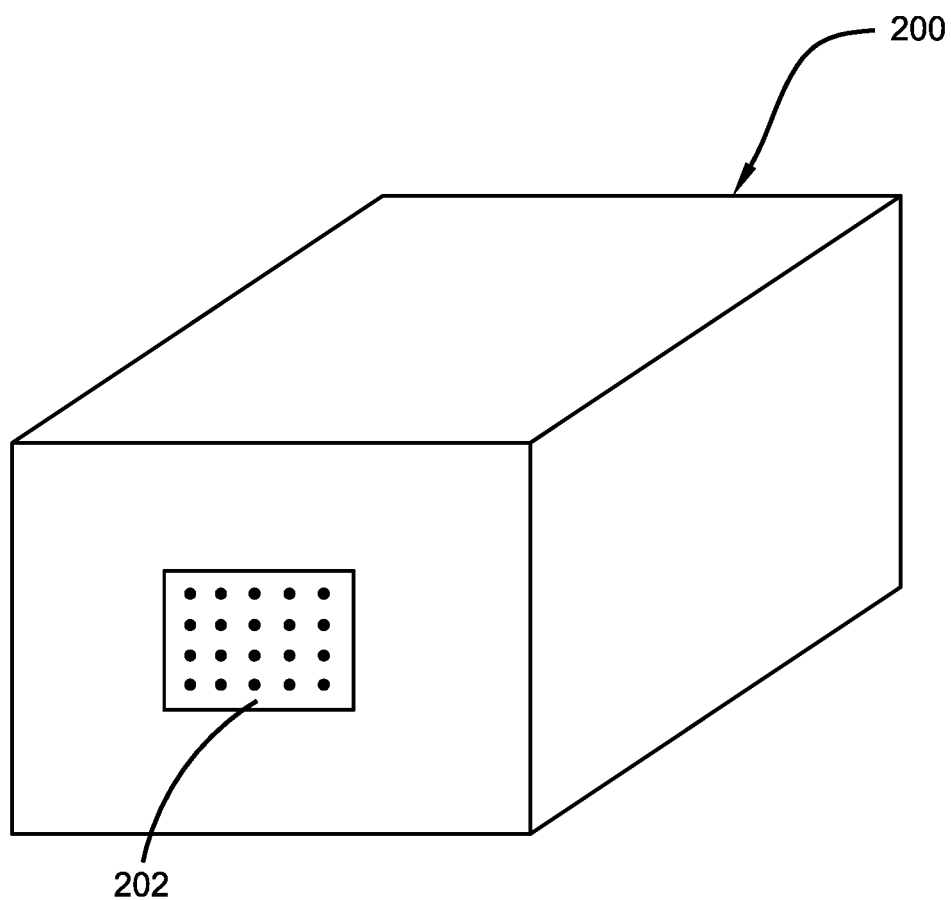
FIG. 2 illustrates a front perspective view of a food packaging container comprising a code identifier component which is linked to an image of the food item contained within the packaging container in accordance with the disclosed architecture.

FIG. 2 illustrates a front perspective view of a food packaging container 200 containing a food item (not shown) or other suitably packaged item as is known in the art. More specifically, the food packaging container 200 is or may be manufactured entirely out of recyclable materials, such as cardboard or any other suitable and easily recyclable material as is known in the art. Importantly, the food packaging container 200 of the present invention does not contain a transparent window for viewing the contents of the container 200. Therefore, the food packaging container 200 of the present invention does not suffer from the limitations of prior art containers 100, and the entire food packaging container 200 can be easily recycled by a consumer once it is no longer needed.

Food packaging container 200 can be any suitable container as is known in the art for housing, storing and/or transporting items, such as food items. Further, container 200 can be any suitable size, shape, and/or configuration as is known in the art without affecting the overall concept of the invention. One of ordinary skill in the art will appreciate that the shape, size and configuration of the container 200 shown in FIG. 2 is for illustrative purposes only, and that many other shapes and sizes of the container 200 are well within the scope of the present disclosure. Although the dimensions of the container 200 (i.e., length, width, and height) are important design parameters for good performance, the container 200 may be any shape or size that ensures optimal performance during use.

Additionally, the food packaging container 200 comprises at least one code identifier component 202, though more than one code identifier components 202 can be utilized with the container 200 depending on the needs and/or wants of the manufacturer, consumer or other user. The code identifier component 202 is typically a 2D bar code or an RFID tag, such as an NFC (near field communication) or UHF (ultra-high frequency) device or any other suitable code identifier as is known in the art. The code identifier component 202 is linked to an image of the contents of the food packaging container 200 and/or related information, such that when a consumer scans the code identifier component 202 an image of the container contents or information related thereto is virtually displayed on an electronic device, such as a tablet, mobile phone, virtual reality headset, a provided terminal, or other suitable device.

Specifically, the virtual image of the contents of the food packaging container 200 can be generic, such as a picture of a cake that is always the same regardless of what type of cake is actually in the container 200. Alternatively, the virtual image can be a specific image, such as a picture of the exact designer cake that is included in the container 200, wherein said specific image can be taken as part of the packaging operation for the food item within the container 200.

Additionally, the virtual image can be associated with the product contents during their manufacture, or when the product contents are packaged in container 200, such as a meat item prepared in a grocery or butcher store. The virtual image can be viewed with a tablet, mobile phone, virtual reality headset, or other suitable device as is known in the art, and the view of the product contents presented to the users is not limited to the view that would be accessible via the transparent window 104 associated with prior art container 100. For example, the view provided by the code identifier component 202 to the viewing device could be a two or three-dimensional image of the product contents, and/or the view could offer additional information about the product contents or any portion thereof, such as nutritional information, product instructions, expiration date, etc. The view could also provide virtual or real special offers or promotional items, linked marketing, coupons, discounts, or any other suitable information related to the product contents as is known in the art.

Figure 3:
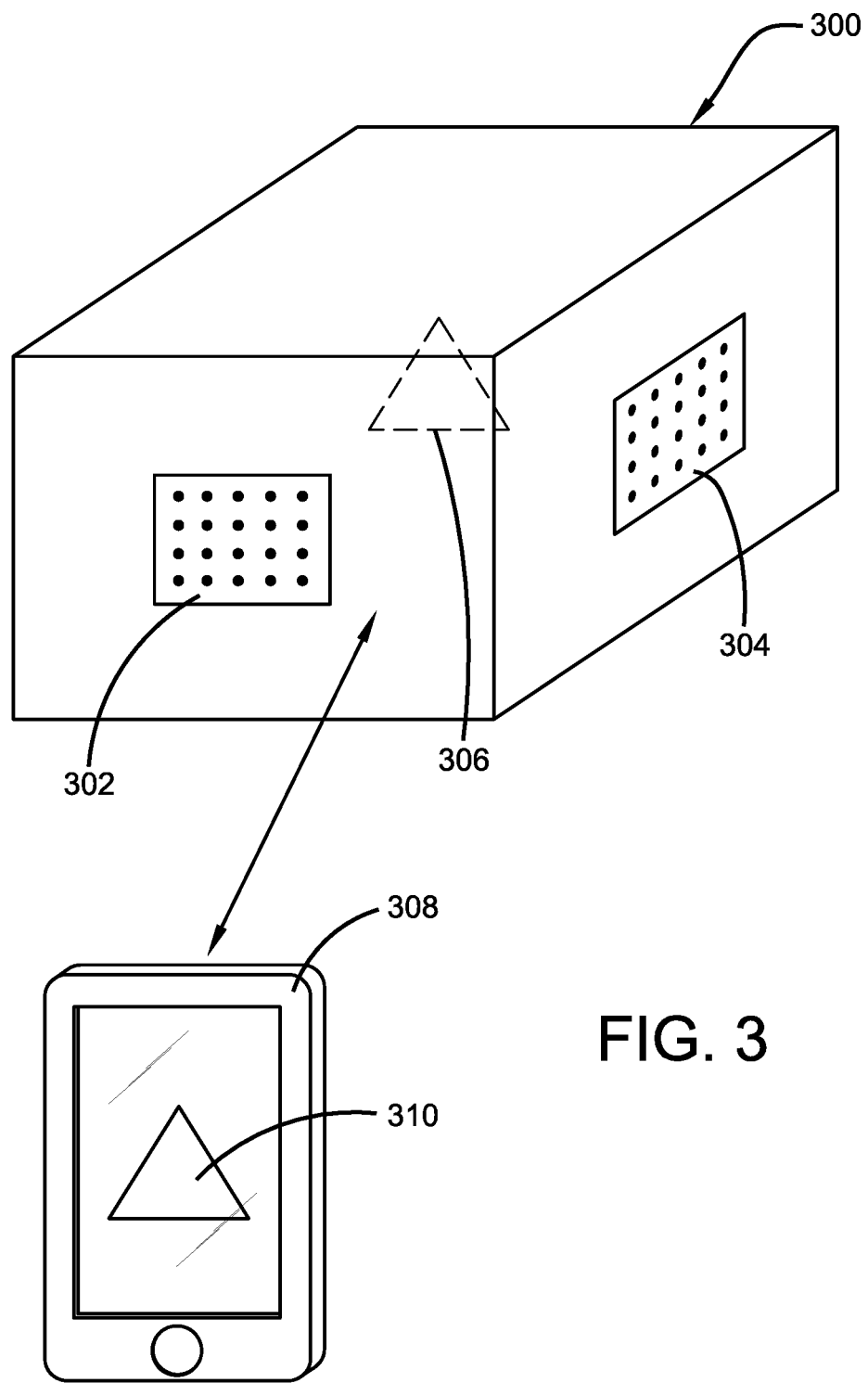
FIG. 3 illustrates a front perspective view of the food packaging container further comprising an additional code identifier component linked to alternate views of the food item contained within the packaging container, and an electronic device in communication with said code identifier components, all in accordance with the disclosed architecture.

FIG. 3 illustrates an alternative embodiment of the present invention, and is a front perspective view of a food packaging container 300 having more than one code identifier component associated with the food item or product 306 positioned within the food packaging container 300. More specifically, the embodiment of the present invention depicted in FIG. 3 discloses a first code identifier component 302 and a second code identifier component 304, which may be used to produce alternate views of the product 306. The first code identifier component 302 can be a unique or generic identifier, such that it discloses a unique or actual view or picture of the product 306 inside the container 300, or a generic view of a related product but not necessarily showing the specific product 306 contained inside the container 300. The second code identifier component 304 may also produce alternate views of the product 306, which can change as the product 306 rotates within the container 300. Thus, the addition of more than one code identifier component allows for three-dimensional viewing of the product 306 prior to purchase and without having to physically open the container 300. Accordingly, the addition of more than one code identifier component provides for alternate views, either unique or generic, of the product 306 or other related product information. The images 310 can then be viewed with an electronic device 308, such as a tablet, mobile phone, virtual reality headset, or other suitable device as is known in the art. Importantly, the view (or images 310) of the product 306 presented to the consumer is not limited to the one specific view that would be accessible to users of the prior art packaging 100 via the transparent window 104.

Figure 4:
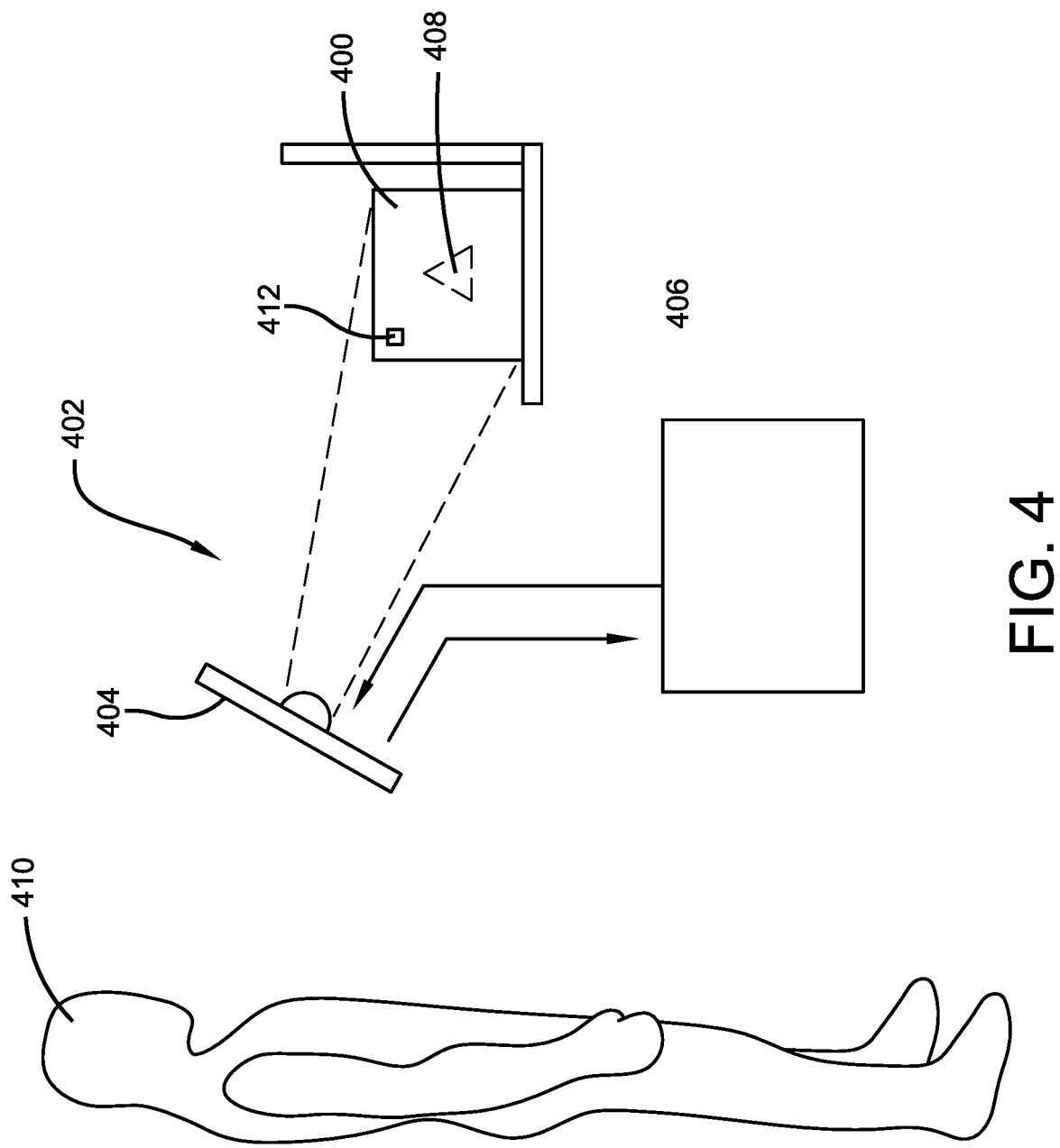
FIG. 4 illustrates a side perspective view of a consumer and a food packaging container with a code identifier component thereon positioned for viewing by a combination of a display screen and a camera in accordance with the disclosed architecture.

FIG. 4 illustrates a further alternative embodiment of the present invention, and is a side perspective view of a food packaging container 400 being read by a terminal 402. Typically, the terminal 402 comprises a display screen 404 and a camera 406, or any other suitable components for viewing the contents of the food packaging container 400 with a food product 408 therein and a code identifier 412 thereon. Shelving or other suitable components as is known in the art may be used for positioning the food packaging container 400 to be conveniently viewed by the camera 406 and a consumer or other user. For example, a user 410 may place the food packaging container 400 on the shelving behind the display screen 404, but in view of camera 406. Then, the camera 406 takes a picture of the food packaging container 400, which is then utilized to read the code identifier component 412. An image is then selected of the food product 408 contained in the food packaging container 400, and presented to the user 410 on the display screen 404. One of ordinary skill in the art will appreciate that the camera 406 can also be a barcode scanner, an RFID reader or any other reading system or scanning technology known in the art.

As stated above, the image presented to the user 410 can be generic, such as a picture of a cake that is always the same regardless of what type of cake is actually in the container 400. In contrast, the image can be specific, such that the image was taken as part of the packaging operation for the food product 408 actually contained within the container 400. Additionally, the image can be associated with the food product 408 during its manufacture, or when the food product 408 is packaged into container 400. Further, the view of the food product 408 presented to the user 410 is not limited to the one specific view that would be accessible to user 410 via the transparent window 104 of prior art containers 100. For example, the view provided by the code identifier component 412 to the viewing device could be a two or three-dimensional image of the product 408, or the view could offer additional nutritional information on the food product 408 and/or could provide virtual or real special offers or promotional items, linked marketing, discounts, or any other suitable information related to the food product 408 as is known in the art.

Figure 5:
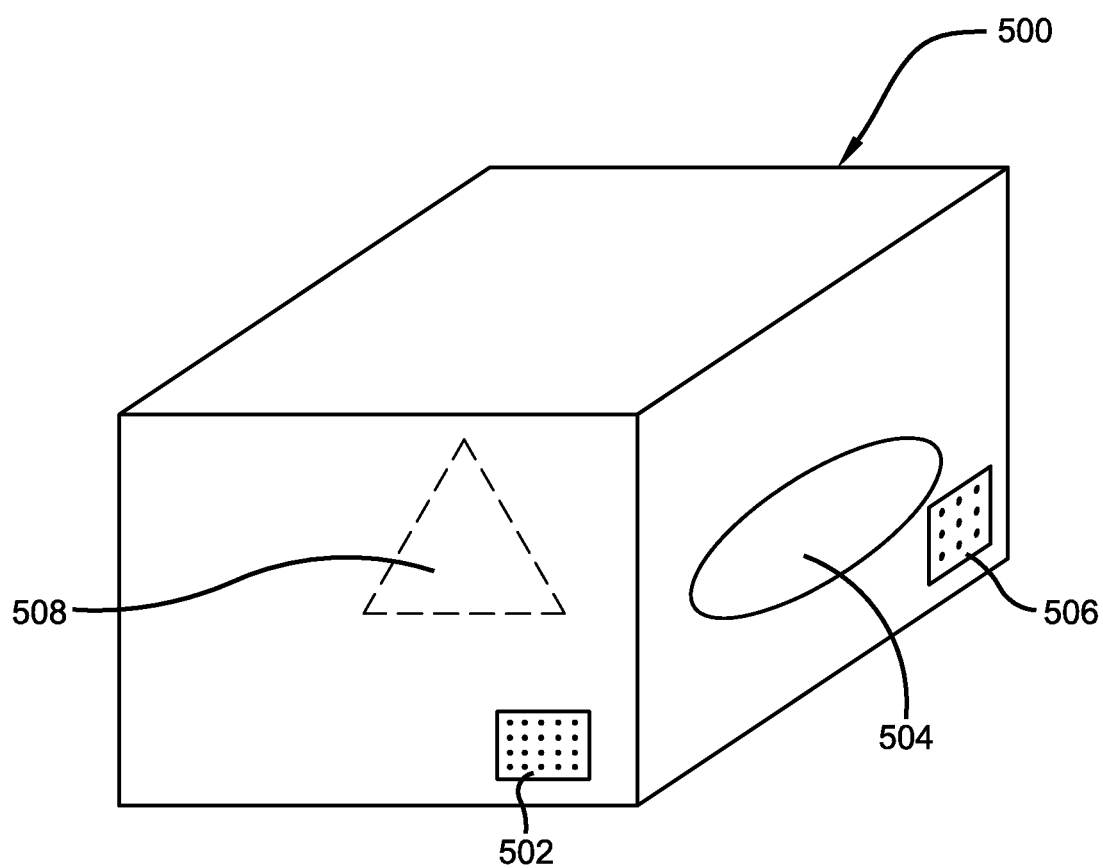
FIG. 5 illustrates a front perspective view of the food packaging container comprising an additional code identifier component thereon that is linked to a promotional item or offer in accordance with the disclosed architecture.

FIG. 5 illustrates a further alternative embodiment of the present invention. More specifically, FIG. 5 is a front perspective view of a food packaging container 500 with a food product 508 contained therein, wherein food packaging container 500 comprises a first code identifier component 502, a promotional item 504 and a second code identifier component 506. The promotional item 504 can be any real or virtual offer or item included with the food packaging container 500. For example, the promotional item 504 can be linked to marketing, coupons, discounts, etc., or any other suitable promotional items or offers as are known in the art. The promotional item 504 can be real and physically attached to the food packaging container 500 (on the exterior or interior) or positioned within the food packaging container 500, or the promotional item 504 can be virtual, wherein the second code identifier component 506 is linked to the promotional offer and the same is viewable on an electronic device, such as a tablet, mobile phone, virtual reality headset, or other suitable device as is known in the art.

The first code identifier component 502 and the second code identifier component 506 are typically a 2D bar code or an RFID tag, such as an NFC (near field communication) or UHF (ultra-high frequency) device or any other suitable code identifier as is known in the art. One or both of the first and second code identifier components 502, 506 may contain images of food product 508 and or information related to or associated with food product 508, such that when a user scans the first and/or second code identifier component 502, 506 an image of the product or food item 508 contained within the container 500 is virtually displayed on a device, or promotional items and offers are displayed on the device. Specifically, the image of food product 508 may be generic, such as a picture of a generic cake that is always the same regardless of what type of cake is actually in the container 500. In contrast, the image can be specific, such that the image was taken as part of the packaging operation for the specific food item 508 actually contained within the container 500.

Additionally, the image can be associated with the food product 508 during its manufacture or when the food product 508 is packaged within container 500, such as a meat item prepared in a grocery or butcher store for sale. The image can be viewed by the consumer with a tablet, mobile phone, virtual reality headset, or other suitable device as is known in the art, such as a point of sale viewing system. Importantly, the view of the food product 104 presented to the consumer (not shown) is not limited to the one specific view that would be accessible via the transparent window 104 of prior art container 100. For example, the view provided by the first and/or second code identifier components 502, 506 to the viewing device could be a two or three-dimensional image of the food product 508, and/or the view could offer additional information on the food product 508 such as nutritional information, food preparation instructions and/or recommendations, "best buy" or expiration information, or any other information that may be useful to the consumer. The view may also provide the consumer with virtual or real special offers or promotional items, linked marketing, discounts, or any other suitable information related or unrelated to the food product as is known in the art.

Figure 6:
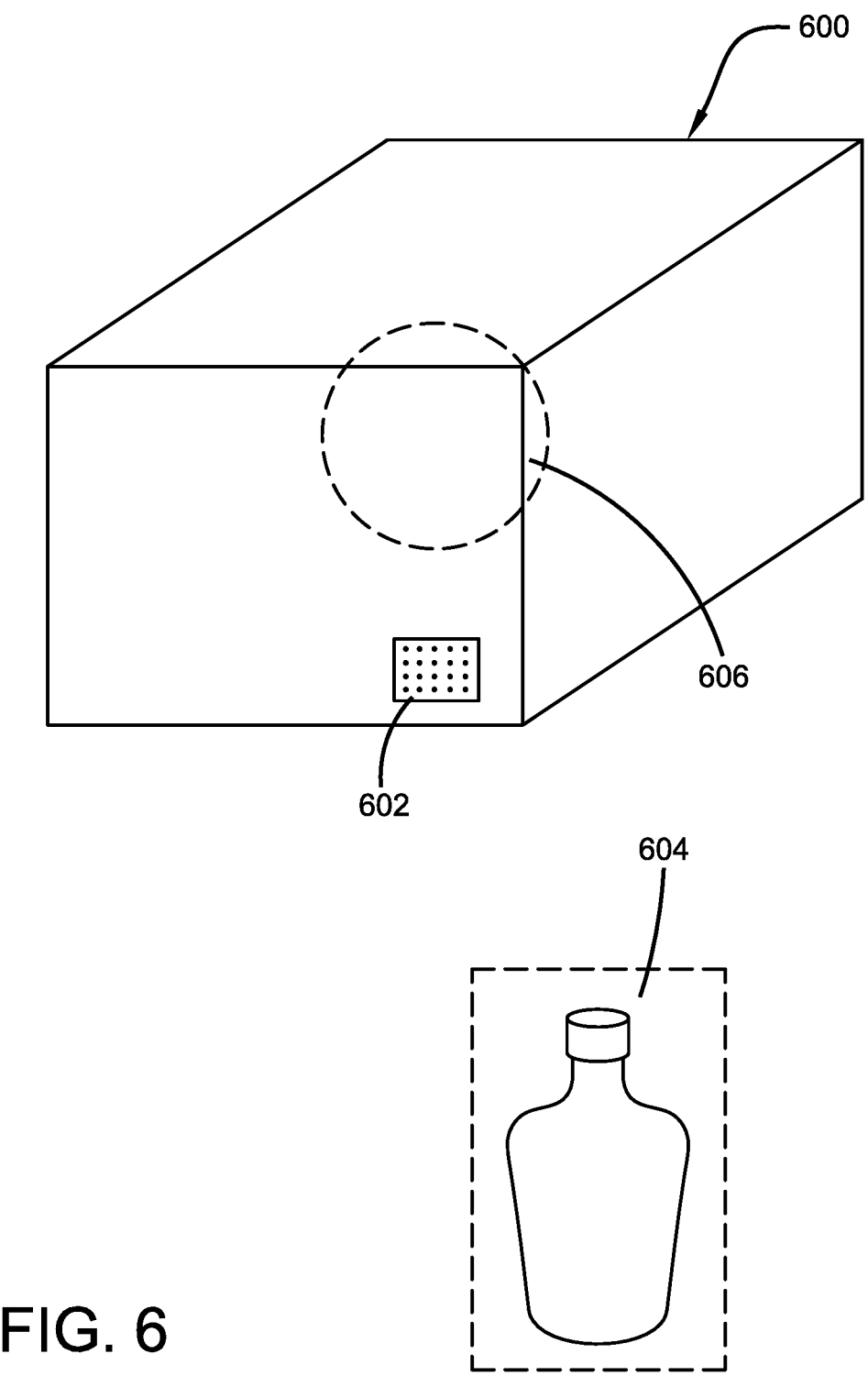
FIG. 6 illustrates a front perspective view of the food packaging container comprising a code identifier component which replaces the view of the food item with the view of a similar item in accordance with the disclosed architecture.

FIG. 6 discloses a further alternative embodiment of the present invention, and a front perspective view of a food packaging container 600 comprising a code identifier component 602 thereon and a food product 660 contained therein. The code identifier component 602, as stated above, is typically a 2D bar code or an RFID tag, such as an NFC (near field communication) or UHF (ultra-high frequency) device or any other suitable code identifier as is known in the art. The code identifier component 602 may be scanned with an electronic device such as barcode scanner, a RFID reader, a tablet, mobile phone, or other suitable scanning device to present the consumer with a generic or specific image of the food product 606 contained within food packaging container 600 and/or addition information related or unrelated thereto. Alternatively, the image presented to the consumer when code identifier component 602 is scanned could be that of an item 604 of similar mass or other characteristics to the food product 606 within the food packaging container 600, as opposed to the food product 606 itself. Stated differently, the image shown to the consumer may be an image of an alternative higher value item having similar mass or other characteristics, thereby presenting the consumer with a choice between various alternatives of the desired product.

Figure 7:
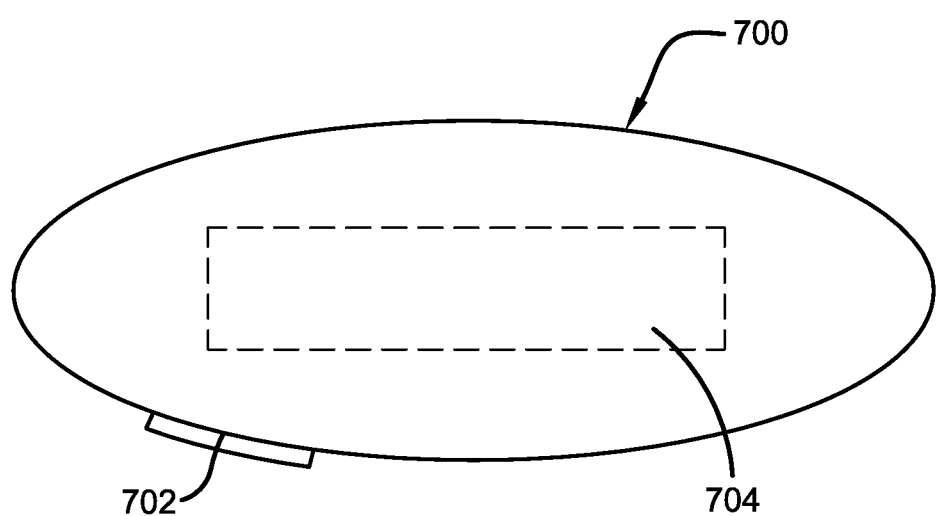
FIG. 7 illustrates a front perspective view of a food packaging container containing a thermally sensitive product and comprising a code identifier component thereon in accordance with the disclosed architecture.

FIG. 7 depicts yet another alternative embodiment of the present invention, and a front perspective view of a food packaging container 700 housing a thermally sensitive product 704 and comprising a code identifier component 702. The code identifier component 702, as stated above, is typically a 2D bar code or an RFID tag, such as an NFC (near field communication) or UHF (ultra-high frequency) device or any other suitable code identifier as is known in the art. The code identifier component 702 is scanned to present the user with a view of the contents of the food packaging container 700, and/or other useful information related or unrelated to the contents. In this manner, the code identifier component 702 allows for the removal of the transparent window 104 typically associated with prior art container 100 (and the various limitations associated therewith) to view the contents of the container 700 prior to purchase and without having to physically open the food packaging container 700.

Accordingly, the code identifier component 702 is linked to an image of the thermally sensitive product 704, such that when a user scans the code identifier component 702 an image of the thermally sensitive product 704 within the container 700 is virtually displayed on a device. Specifically, the image can be generic, such as a picture of a cake that is always the same regardless of what type of cake is actually in the container 700. In contrast, the image can be specific, such that the image was taken as part of the packaging operation for the thermally sensitive product 704 within the container 700. Additionally, the image can be associated with the thermally sensitive product 704 during its manufacture, or when the product is packaged in container 700. The image can be viewed with a tablet, mobile phone, virtual reality headset, or other suitable device as is known in the art. The view of the thermally sensitive product 704 presented to the users is not limited to the one specific view that would be accessible via the transparent window of prior art packaging devices.

For example, the view provided by the code identifier component 702 to the viewing device could be a two or three-dimensional image of the thermally sensitive product 704, or the view could offer additional nutritional information on the product or on parts of the product, and/or can provide virtual or real special offers or promotional items, linked marketing, discounts, or any other suitable information related to the product 704 as is known in the art. Accordingly, removal of the transparent window allows the food packaging container 700 to be manufactured of protective materials to protect specific products, such as thermally sensitive products 704, or any other suitably sensitive products. The protective materials can include environmentally sustainable starch foam or paper, etc., or any other suitable protective materials as is known in the art.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A packaging system comprising:
   a container housing an item;
   a code identifier component positioned on the container;
   a device for reading the code identifier component; and
   a display screen associated with the device configured to display an image of the item housed in the container according to the read code identifier component, wherein the code identifier component is linked to the image of the item housed in the container.

2. The system of claim 1, wherein the code identifier component is a bar code.

3. The system of claim 1, wherein the code identifier component is an RFID tag.

4. The system of claim 1, wherein the image of the item is the exact item housed in the container.

5. The system of claim 1, wherein the container is comprised of a recyclable material.

6. The system of claim 1, wherein the device consists of one of a phone, a camera, a scanner, a tablet or a RFID reader.

7. The system of claim 1, wherein the system further comprises a second code identifier component.

8. A packaging system comprising:
   a container comprised of a recyclable material and housing a food item;
   a code identifier component positioned on the container, wherein the code identifier component is linked to an image of the food item housed in the container;
   a device for reading the code identifier component; and
   a display screen associated with the device configured to display the image of the food item housed in the container according to the read code identifier component.

9. The system of claim 8, wherein the code identifier component is further linked to a promotional item.

10. The system of claim 8, wherein the code identifier component is further linked to additional information related to the food item.

11. The system of claim 8, wherein the code identifier component displays a three dimensional image of the food item.

12. The system of claim 8, wherein the code identifier component is a barcode.

13. The system of claim 8, wherein the code identifier component is an RFID tag.

14. The system of claim 8 further comprising a second code identifier component.

15. The system of claim 8, wherein the image of the food item is the exact food item housed in the container.

16. A virtual food packaging system comprising:
    a container housing a food item;
    a first code identifier component positioned on the container, wherein the first code identifier component is linked to an image of the food item;
    a second code identifier component positioned on the container, wherein the second code identifier component is linked to a promotional item; and
    a combination of a camera and a display screen for reading the first and the second code identifier components positioned outside of the container and displaying the image of the food item housed in the container and the promotional item.

17. The system of claim 16, wherein the image of the food item is displayed as a three dimensional image.

18. The system of claim 16, wherein at least one of the first and second code identifier components is comprised of a RFID tag or a barcode.

* * * * *